United States Patent [19]

Hardison

[11] Patent Number: 5,296,205
[45] Date of Patent: Mar. 22, 1994

[54] MULTI-BED MASS TRANSFER COLUMN WITH MOBILE PACKING

[75] Inventor: Leslie C. Hardison, Barrington, Ill.

[73] Assignee: ARI Technologies, Inc., Palatine, Ill.

[21] Appl. No.: 682,543

[22] Filed: Apr. 8, 1991

[51] Int. Cl.$^5$ .............................................. C01B 17/16
[52] U.S. Cl. .................... 423/220; 423/231; 422/141; 422/142; 422/176; 210/678; 210/795
[58] Field of Search .............. 423/231, 220; 422/140, 422/141, 142, 176; 210/795, 678; 502/527

[56] References Cited

U.S. PATENT DOCUMENTS

| | | | |
|---|---|---|---|
| 4,011,304 | 3/1977 | Mancini et al. | 423/573 G |
| 4,108,682 | 8/1978 | Takeda et al. | 134/25 R |
| 4,125,597 | 11/1978 | Fleck | 423/573 R |
| 4,189,462 | 2/1980 | Thompson | 423/573 G |
| 4,218,342 | 8/1980 | Thompson | 252/431 C |
| 4,374,104 | 2/1983 | Primack | 423/226 |
| 4,455,287 | 6/1984 | Primack et al. | 423/573 R |
| 4,622,212 | 11/1986 | McManus et al. | 423/226 |
| 4,668,405 | 5/1987 | Boze | 210/795 |
| 4,719,020 | 1/1988 | Elmaleh | 210/807 |

FOREIGN PATENT DOCUMENTS 2702972 7/1977 Fed. Rep. of Germany ...... 210/678
61-204020 9/1986 Japan ................................. 422/176

*Primary Examiner*—Gary P. Straub
*Assistant Examiner*—Timothy C. Vanoy
*Attorney, Agent, or Firm*—Allegretti & Witcoff, Ltd.

[57] ABSTRACT

A packed mass transfer tower for establishing intimate gas-liquid contact and efficient mass transfer that is less susceptible to gas or liquid channeling, gas surging and uneven distribution of gas or liquid across the cross-sectional area of the tower. In one embodiment, the packed tower includes a packing arrangement including a loosely packed bed of mobile packing material, and an adjacent, tightly packed bed of mobile packing material. The relatively tightly packed bed of mobile packing material acts as a gas distributor, as well as being a material that causes good gas-liquid contact, to provide an even flow of gas across essentially the entire cross-sectional area of the loosely packed bed of mobile packing material. In another embodiment, mobile packing elements and fixed packing elements are intermixed between the same spaced fluid-pervious grids. In the second embodiment, the fixed packing elements hug the lower pervious grid to evenly distribute gas and liquid to the mobile packing elements that are aerated above the fixed packing elements during mass transfer.

16 Claims, 1 Drawing Sheet

FIG.1
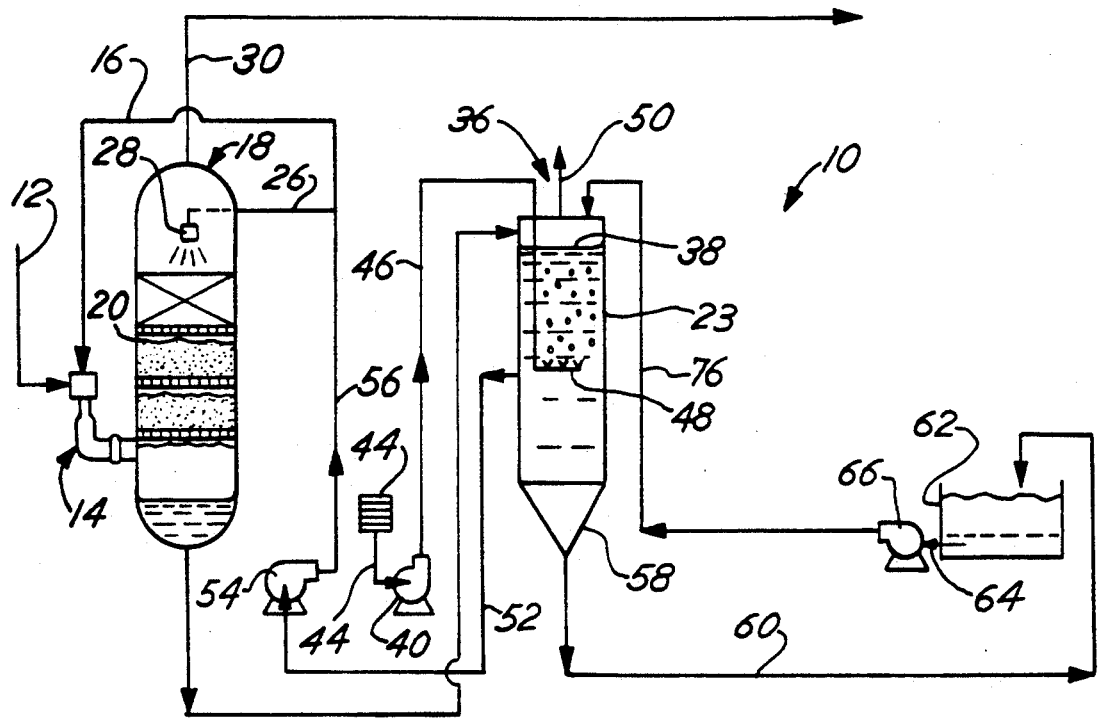
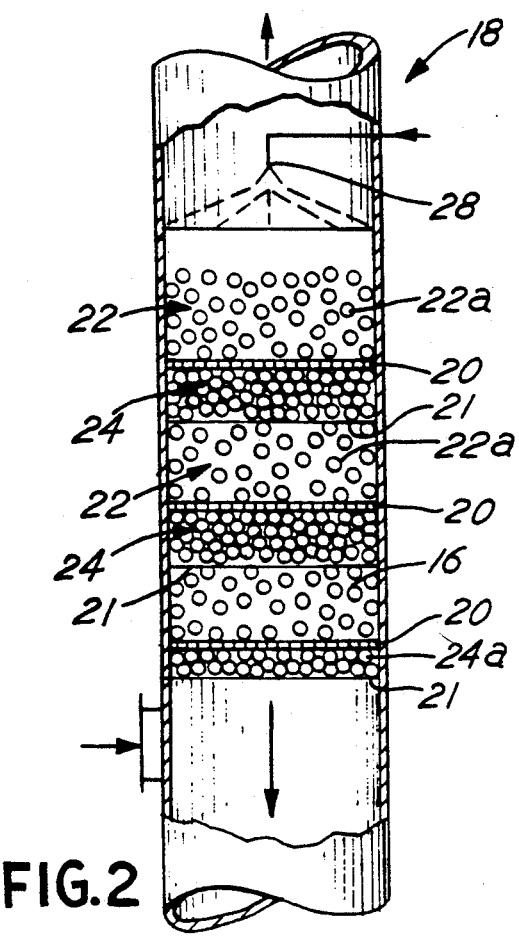
FIG.2
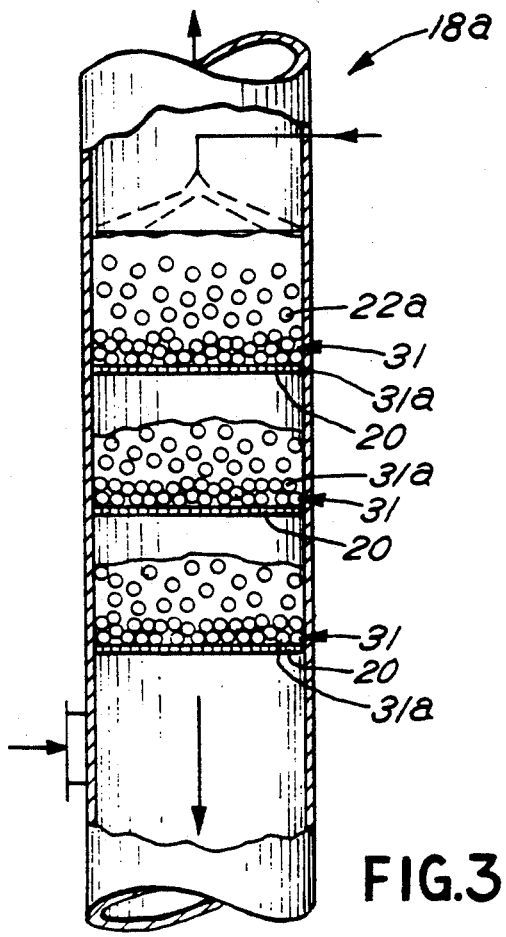
FIG.3

MULTI-BED MASS TRANSFER COLUMN WITH MOBILE PACKING

BACKGROUND OF THE INVENTION

1. Field of the Invention

This invention relates to packed tower or packed column structures used for intimate contact between a gas and a liquid to effect mass transfer therebetween. More particularly, this invention relates to a specific packing arrangement for a packed tower that includes a combination of a bed of mobile packing material arranged relatively loosely between fluid pervious spaced grids and a second bed of mobile packing material arranged relatively densely or tightly between more closely spaced grids adjacent thereto, to provide a more even distribution of gas through the loosely packed mobile bed and prevent the mobile packing material, liquid and gas streams from being unevenly distributed. The packing arrangement is particularly useful for gas-liquid mass transfer in relatively large absorption towers having a cross-sectional area more than about 3 ft$^2$, where gas channeling, and surging of gas and packing material is most prevalent. In a second embodiment, mobile packing elements and fixed packing elements are intermixed to form a dual bed containing a lower bed of fixed packing elements for even gas distribution to an upper mobile bed of aerated packing elements, both beds disposed between the same spaced grids. This invention is particularly useful in gas-liquid contacting processes where the packed tower or column is prone to undergo plugging due to the presence or formation of solid material within the tower.

2 Related Technology

It is well known that packed towers or columns are often useful for efficient gas-liquid contact to provide interactions, reactions and other mass transfer operations between gas and liquid. However, in some such operations the fluid passing through the packed bed contains suspended solid particles that tend to accumulate on the packing, eventually resulting in a reduction in gas-liquid volumetric flow rates and, in extreme cases, plugging of the tower.

Such plugging problems occur, for example, when a packed tower is used with liquids or gases that contain particulate material, or when particulates are formed within the tower as a result of a chemical interaction, reaction or the like, that precipitates solids as a result of mass transfer between the liquid and the gas. For example, in flue gas scrubbing that utilizes a liquid stream that includes an aqueous solution or suspension of limestone, or the like, to remove sulfur dioxide contained in a gas stream, a calcium sulfate precipitate is formed in the tower, and the resulting aqueous slurry causes plugging problems. Another example is a gas-liquid interphase oxidation process for removal of hydrogen sulfide from a gas stream that uses an oxidizing solution to effect oxidation of hydrogen sulfide to form elemental sulfur particles. Such particles may cause plugging of packed towers, requiring periodic shutdown of the process for a difficult and time consuming cleaning of the tower.

Some prior processes have used packed towers for contact of hydrogen sulfide (H$_2$S)-containing gases with an aqueous iron-chelate solution or a so-called "Stretford"-type alkaline vanadium ion-containing wash solution that converts H$_2$S to elemental sulfur (S°). The elemental sulfur formed is entrained in the liquid mixture, and removed from the liquid, e.g. by settling or filtration. In this type of H$_2$S removal process, some of the sulfur settles on the packing material, thereby lowering gas and liquid flow rates and, ultimately, the sulfur plugs the tower. Mobile packing beds have been used in packed towers for sulfur removal from H$_2$S-containing gas streams but suffer from uneven gas distribution and channeling problems, particularly in larger cross-sectional area towers, resulting in decreased efficiency.

It is well known that two of the most important characteristics necessary for effective and efficient gas-liquid mass transfer in packed towers are 1) the tower must contain adequate passages for both the liquid and the gas streams without excessive liquid holdup or pressure drop; and 2) the tower must provide good contact between liquid and gas. The requirement of good contact between liquid and gas is the most difficult to meet, especially in large towers. Ideally, the liquid, once distributed over the top of the packing, flows in thin films over all the packing surface completely down the tower. Actually, the films tend to grow thicker in some places and thinner in others, so that the liquid collects into small rivulets and flows along localized paths through the packing. Especially at low liquid rates, and in the larger towers, some of the packing surface may be dry or covered with a stagnant film of liquid. This effect is known as "channeling" and is the main reason for poor performance in large packed towers. Similarly, a countercurrently flowing gas stream, especially in larger towers, sometimes tends to follow localized paths instead of being distributed across the entire cross-section of the tower, with a consequent increase in velocity through these localized paths, and this effect is known as "surging".

The use of mobile packing beds tends to decrease or eliminate packing material fouling adds to the "channeling" and "surging" problems inherent in packed towers of relatively large cross-sectional area due to the tendency of the relatively light mobile packing material to collect along the sides and other localized areas of the tower, further decreasing the desired cross-sectional uniformity of gas and liquid flow. This reduces the overall efficiency in relatively large mobile bed gas-liquid contact devices. This problem has been recognized for many years but, to date, no adequate solution to the channeling and surging problems has been achieved. Others have provided vertical partitions in the columns between grids, to provide a plurality of partitioned packing beds between adjacent grids, thereby decreasing the cross-sectional area of each separate packing bed. This partitioning has aided the gas and liquid flow uniformity, but not completely satisfactorily, and has created other problems, such as the attendant difficulty in loading and unloading packing material and making sure that loading is done uniformly within each separate compartment.

The present invention solves this gas-liquid flow problem within mobile bed packed towers, without vertically partitioning the mobile beds, by including a relatively tightly packed, relatively short mobile bed of packing material directly above or below normally packed mobile beds in a gas-liquid mass transfer tower. In a second embodiment of this invention, the bed of packing material includes both 1) mobile packing elements capable of being aerated within the packing bed during mass transfer, and 2) heavier, fixed packing elements that remain against a lower grid of the packing bed during mass transfer to evenly distribute the gas stream through the mobile packing elements.

SUMMARY OF THE INVENTION

In brief, the present invention is directed to a packed mass transfer tower for establishing intimate gas-liquid contact and efficient mass transfer that is less susceptible to gas or liquid channeling, gas surging and uneven distribution of gas or liquid across the cross-sectional area of the tower. In one embodiment, the packed tower includes a packing arrangement for a mobile bed mass transfer stage including a loosely packed bed of mobile packing material, such as hollow spheres, packed in the usual arrangement e.g. such that when static, the height of the mobile packing material is at most 75% of the height of the spacing between upper and lower grids that define the stage of the tower. Disposed directly adjacent to the loosely packed bed of mobile packing material, and sharing a common grid therewith, is a relatively tightly packed bed of mobile packing material that acts as a gas distributor, as well as being a material that causes good gas-liquid contact, to provide an even flow of gas across essentially the entire cross-sectional area of the loosely packed bed of mobile packing material. The mobile packing material forming the tightly packed mobile bed is packed tightly enough to prevent any substantial vertical movement of the mobile packing elements, e.g. such that when static, it occupies a height of no less than 90% of the height of the tightly packed mobile bed stage of the tower, defined as the tower stage height between upper and lower pervious grids that the tightly packed bed of mobile packing material is disposed between.

The loose packing arrangement of at least one mobile packing bed allows the bed to function in its usual manner in achieving good gas-liquid contact and efficient mass transfer, while enabling the material to self clean due to the constant agitated state of, and resulting contact between, the spheres. In accordance with an important feature of the present invention, the adjacent, tightly packed mobile bed is sufficiently loose to permit constant agitation, and therefore self-cleaning, but is packed tightly enough to provide an even distribution of gas to the associated loosely packed mobile bed to maintain a relatively even distribution of packing material in the associated upper bed, and to minimize gas channeling, surging and sulfur fouling.

In the second embodiment of the present invention, packing elements disposed between two spaced grids includes a combination of 1) relatively light (e.g. specific gravity less than 1.0) mobile packing elements, preferably spherical in shape, that are aerated upwardly during normal gas flow rates through the tower and 2) relatively heavy fixed packing elements that do not move substantially vertically under normal gas flow rates through the tower. The fixed packing elements also are preferably spherical in shape, and preferably of the same size as the mobile packing elements, e.g. about 1 to about 10 centimeters in diameter, preferably about 2 to about 5 centimeters in diameter. The combined mobile and fixed packing elements achieve essentially the same results as in the first embodiment of the present invention. The fixed or heavier packing elements hug the lower pervious grid of the packed bed to evenly distribute gas and liquid to the aerated mobile packing elements, to achieve efficient mass transfer without significant channeling or surging problems.

Accordingly, an aspect of the present invention is to provide a new and improved mass transfer tower and method of achieving efficient gas-liquid contact.

Another aspect of the present invention is to provide a method of continuously contacting gas and liquid in a bed of mobile packing elements while essentially eliminating channeling and surging problems to maintain a uniform flow distribution of gas and liquid across the cross-sectional area of the bed of packing elements.

Another aspect of the present invention is to provide a mass transfer tower that includes some packing elements capable of substantial vertical displacement during mass transfer between countercurrently flowing gas and liquid streams, and some packing elements that are held relatively closely together during mass transfer to provide both mass transfer efficiency and even gas and liquid distribution over the cross-sectional area of the packed bed.

Still another aspect of the present invention is to provide a gas-liquid contact tower including a bed of relatively light, mobile packing elements as well as relatively heavy, vertically fixed packing elements to achieve a bed of both fixed and mobile packing elements wherein the fixed elements act as a gas distributor to evenly distribute gas to the agitated and aerated mobile packing elements.

A further aspect of the present invention is to provide an improved method of removing hydrogen sulfide from a hydrogen sulfide-containing gas stream with a liquid phase oxidation solution wherein hydrogen sulfide is converted to elemental sulfur, using a mobile and relatively fixed packing element arrangement within a packed tower.

Another aspect of the present invention is to provide an improved packed tower for efficient gas-liquid contact that has a reduced rate of packed tower plugging, while maintaining excellent gas-liquid contact and high solid particle removal efficiency.

Other aspects and advantages will be apparent to those skilled in the art from the following detailed description of the preferred embodiment, taken in conjunction with the drawings and the appended claims.

BRIEF DESCRIPTION OF THE DRAWINGS

FIG. 1 is a simplified flow diagram of a gas-liquid contact oxidation process for removing hydrogen sulfide from a gas stream using the packed tower apparatus of the present invention;

FIG. 2 is a partially broken-away, elevational view of the packed tower of FIG. 1, illustrating the distribution of packing elements within the packed beds during countercurrent gas and liquid flow; and FIG. 3 is a partially broken-away, elevational view of a second embodiment of the packed tower useful in the process shown in FIG. 1.

DETAILED DESCRIPTION OF THE PREFERRED EMBODIMENT

For purposes of illustration only, and not by way of limitation, the invention is described with specific reference to a liquid phase oxidation process for the removal of hydrogen sulfide from a gas stream. In a process of this type, e.g., the so-called Stretford process, or the process marketed under the trademark LO-CAT ® by ARI Technologies, Inc. of Palatine, Ill., a hydrogen sulfide-containing gas is contacted in a gas-liquid contactor or tower with a suitable aqueous treating solution, e.g., an oxidizing solution containing a polyvalent metal in its higher valence state. In the contactor, hydrogen sulfide is oxidized to elemental sulfur in the form of solid particles that are entrained (e.g., suspended or slurried) in the treating solution, and the polyvalent metal is reduced to its lower valence state. The solution is subsequently regenerated by contact with air or another oxygen-containing gas to convert the reduced polyvalent metal to its higher valence state for use in the contactor. The sulfur formed in the contactor is recovered from the aqueous treating solution by flotation, settling, filtration, or any other suitable separation technique.

When using a packed tower as a contactor, countercurrent contacting is usually preferred but cocurrent contacting can be used under some circumstances. In a countercurrent system, the hydrogen sulfide-containing gas is passed upwardly through the packed bed(s) and the aqueous treating solution is passed downwardly through the packed bed(s) in intimate contact with the upwardly flowing gas stream. The sulfur particles formed by the oxidation of hydrogen sulfide tend to accumulate on the packing or on the packing support grid resulting in eventual plugging of the tower. In most instances, the plugged tower must be periodically taken out of service for removal and washing of the packing and for cleaning of the support grid. Consequently, in the past it has usually been necessary to provide two or more packed towers so that at least one tower is available for continuous operation of the process while the other tower is being serviced.

It will be understood that the apparatus and process configurations shown in the drawings are illustrative only and that the inventive process and apparatus can be used with the Stretford or various LO-CAT ® processes familiar to those skilled in the art, such as those disclosed in U.S. Pat. Nos. 4,011,304.; 4,125,597,; 4,189,462; 4,218,342; 4,374,104; 4,455,287; 4,622,212; and 4,865,819. These patents illustrate the known chemistry for $H_2S$ gas conversion to elemental sulfur and the combinations of oxidizing/reducing metals and chelating agents capable of retaining metals in solution over a wide range of pH and other process conditions. Although iron and vanadium are the polyvalent metals which are most commonly used, chelating agent solutions of other metals including copper, platinum, tungsten, nickel, mercury, tin, lead, and the like also can be used.

FIG. 1 is an illustration of one manner of utilizing the packed tower of the present invention in the LO-CAT ® sulfur removal process, generally designated by reference numeral 10, but the packed towers of the present invention also can be used with Stretford and other processes.

A feed gas stream containing hydrogen sulfide is introduced through conduit 12 to a venturi mixer 14 where the gas is intimately pre-mixed with regenerated chelated iron solution supplied to the mixer 14 through conduit 16. The outlet from the mixer 14 communicates with a lower portion of a vertical multi-bed packed scrubbing tower, generally designated by reference numeral 18. In the embodiment of the invention illustrated in FIG. 2, packing support grids 20 are mounted in the tower 18, as shown, to define a volume for a loosely packed bed of mobile packing elements, generally designated 22, and an adjacent more tightly packed bed of mobile packing elements, generally designated 24, is disposed between a lower surface of grid 20 and an adjacent grid 21. The packing material forming the loosely and tightly packed beds 22 and 24 can be formed of the same or different materials, preferably spherical packing elements 22a and 24a, respectively. One or more loosely packed beds 22 of discrete mobile packing elements 22a is supported on an associated grid 20, and one or more tightly packed beds 24 of discrete mobile packing elements 24a is supported on an adjacent lower grid 21, such that the mobile packed bed 22 is relatively loosely packed, and packed bed 24 is relatively tightly packed to provide the advantages of the present invention, as described in more detail hereinafter. Regenerated treating solution is supplied to an upper portion of the tower 18 through conduit 26 and a spray nozzle 28. An effluent gas conduit 30 extends from the upper portion of the tower 18 above the spray nozzle 28.

In the embodiment of the invention illustrated in FIG. 3, a packed tower, generally designated 18a, is operated in the same way as tower 18 of FIG. 2, except that tower 18a includes fixed packing elements that are intermixed with the mobile packing elements 22a to establish a lower bed 31 of fixed packing elements 31a disposed below the mobile bed 22 of mobile packing elements 22a—both packed beds 22 and 31 disposed between a single pair of spaced fluid-pervious grids 20. During operation of the mass transfer tower 18a, as illustrated in FIG. 3, the bed of heavier, fixed packing configuration against the lower grid 20, while the mobile packing elements 22a are aerated vertically upwardly to achieve efficient mass transfer between the gas and liquid through the tower 18a. The mobile packing elements 22a preferably are spherical and may be hollow or solid, but should be light enough (e.g. a specific gravity less than 1.0, and preferably less than about 0.5) to be aerated upwardly from the fixed bed 31 during normal flow rates of gas and liquid in the tower 18a. The fixed packing elements 31a also are preferably spherical and are heavy enough (e.g. a specific gravity greater than 1.0) so that they are not greatly aerated during normal flow rates of liquid and gas through the tower 189.

The feed gas passes upwardly through the packed beds 24 or 31 and 22, and treating solution from the spray nozzle 28 passes downwardly through the beds 22 and 24 or 31 in countercurrent contact with the upwardly flowing gas stream. Although countercurrent gas-liquid contact in the tower 18 is preferred, the invention is not limited to the use of countercurrent flow. Further, the tightly packed bed 24 can be disposed above, instead of below, the loosely packed bed 22 to aid in achieving more even distribution of gas and liquid. The treated gas, which is substantially free of hydrogen sulfide, is removed from the upper portion of the tower 18 through conduit 30. A liquid slurry of treating solution and suspended sulfur particles accumulates in the lower portion of the tower 18, as indicated by the upper liquid level 32, and the slurry is withdrawn at a controlled rate through conduit 34.

The used treating solution containing reduced metallic ions, e.g., reduced forms of iron or vanadium ions, is regenerated by passing the slurry from conduit 34 into an upper portion of an oxidizer vessel generally designated 36 where the slurry accumulates, as shown by the upper liquid level 38. Air is supplied to the oxidizer 36 by means of a blower 40 having an inlet conduit 42 associated with gas filter 44, and an outlet conduit 46 connected to a sparger ring 48 located in the oxidizer vessel 36 substantially below the liquid level 38. Air from the sparger ring 48 bubbles upwardly through the used treating solution and oxidizes the metallic ions to their higher valence state. The air, having a slightly diminished oxygen content, is vented from an upper portion of the oxidizer vessel 36 through conduit 50. The regenerated treating solution is withdrawn from the oxidizer vessel 36, below the sparger ring 48 through a suction conduit 52 by means of recirculating pump 54 and is supplied to the tower 18 through a discharge conduit 56 connected to tower inlet conduits 26 and 16.

In the oxidizer vessel 36, a major portion of the sulfur settles to a cone-shaped bottom portion 58 so that the treating solution withdrawn through conduit 52 for recirculation to the tower 18 contains only a minor amount of sulfur. A dense slurry of sulfur particles is supplied from the bottom portion 58 of oxidizer vessel 36 through conduit 60 to a sulfur filter 62. The sulfur-free filtrate is withdrawn from the filter through conduit 64 and pump 66 and pumped through conduit 68 to an upper portion of the oxidizer vessel 36.

The contacting of the feed gas with the treating solution in the tower 18 may be carried out at ambient temperature and pressure conditions, but temperatures of from about 5° C. to about 65° C. and pressures ranging from subatmospheric to 100 atmospheric or greater can be used. A pH ranging from about 6 to about 13, particularly from about 6 to about 10.5, is preferably maintained by adding alkaline material as required. The redox potential of the solution may be used as a measure of catalyst activity as reflected by the ratio of ferric to ferrous ions in solution. Maintaining a redox potential of from about $-50$ to about $-300$, as measured by a calomel electrode, is desirable.

FIG. 2 shows, schematically, the structure of a preferred embodiment of the gas-liquid contact scrubbing tower 12, having a bed 22 of mobile packing material 22a with sufficient space for vertical movement of the mobile packing elements within each compartment or stage, and an adjacent more tightly packed bed 24 of mobile packing material 24a, supported below by grid 21 and having an upper grid 20 that is the same as the lower grid 20 of the upwardly adjacent mobile bed 22. Each loosely packed bed 22 of mobile packing material 22a and its adjacent tightly packed bed 24 of mobile packing material 24a is supported in the tower 18 on lower fluid-pervious grids 20 and 21, respectively. The particular design or structure of the pervious grids 20 and 21 is not critical to the practice of the invention, but the purpose of the grids is to support and separate the respective mobile packing elements into their respective zones or stages of the tower 18 while allowing relatively large total open area in the grids to permit the passage of gas being treated and aqueous liquid for mass transfer therebetween in the tower 18. The details of a particularly preferred grid support structure useful in the liquid-gas contact tower of this invention are described in Dowd, et al. U.S. Pat. No. 4,865,819, the disclosure of which is incorporated herein by reference.

To achieve the full advantage of the present invention, particularly for mass transfer in a process where solids are formed within the tower 18, the mobile packing elements 22a and 24a or 31a are spherical, having a diameter of about 1 centimeter to about 10 centimeters preferably about 2 centimeters to about 5 centimeters in diameter, so that the agitation and aeration of the packing elements achieves self-cleaning of the packing elements 22a and 21a without requiring shut down of the tower for packing material cleaning. The fixed heavier packing elements 31a of FIG. 3 also are preferably spherical to eliminate any sharp corners and crevices between adjacent elements 31a, and between packing elements 31a and the lower grid 20, so that solids are less likely to accumulate and plug the tower 18a. However, the invention is not limited to a particular shape of mobile packing material 22 or 22a or fixed packing elements 31a. Mobile packing elements can be known forms of polypropylene or other plastic beads, of a size and density selected to be retained upon the grid structure 20 and 21, and a sufficiently low specific gravity, e.g. less than 1.0, to be easily mobilized within the gas-liquid contact apparatus 18. An example of a commercially available packing material which may be used as elements 22a, 24a and 31a is hollow plastic spheres manufactured by EURO-MATIC, LTD. of London, England.

The multiple mobile packing beds arranged in the gas-liquid contact tower 18 in accordance with the FIG. 2 embodiment, and the intermixed mobile and fixed packing elements of the FIG. 3 embodiment of the present invention alleviate problems associated with low sulfur removal efficiencies in prior known mobile packing bed contact towers, and provide good gas distribution to maintain even fluidization throughout the mobile packing beds. With the arrangement of both embodiments of the invention, as described, a sufficient number of stages of self-cleaning, mobile packing elements are provided to convert unexpectedly high levels of the hydrogen sulfide, from the gas being treated, as elemental sulfur particles retained in the aqueous medium. In addition, the tightly packed bed 24 of mobile packing material 24a acts as an excellent gas distributor correcting any maldistribution of the gas for contact with the liquid solution which may occur in the mobile beds 22.

The foregoing detailed description is given for clearness of understanding only, and no unnecessary limitations should be understood therefrom, as modifications within the scope of the invention will be apparent to those skilled in the art.

It should be understood that the present disclosure has been made only by way of preferred embodiment and that numerous changes in details or construction, combination and arrangement of parts can be resorted to without departing from the spirit and scope of the invention as hereunder claimed.

What is claimed is:

1. A packed tower for use in gas-liquid contacting forming solid particulates within the tower, comprising;
    at least one loosely packed bed of mobile parking elements disposed in said tower;
    at least one packed bed of relatively fixed mobile packing elements disposed in said tower vertically adjacent to said loosely packed bed;
    said mobile packing elements in both the loosely packed bed and the relatively fixed packed bed having a density such that the packing elements float in water;
    means for flowing gas sequentially through said packed beds; and
    means for flowing liquid essentially through said packed beds for intimate contact and mass transfer with said gas.

2. The apparatus of claim 1 comprising at least two stages of loosely packed beds of mobile packing material each disposed vertically above said tightly packed beds of mobile packing material.

3. The apparatus of claim 1 wherein the mobile packing elements comprise hollow polymeric spheres having a diameter of about 2 centimeters to about 5 centimeters.

4. The apparatus of claim 1, wherein the relatively fixed mobile packing elements are spherical.

5. The apparatus of claim 1 wherein the relatively fixed mobile packing elements comprise hollow polymeric spheres having a diameter of about 2 centimeters to about 5 centimeters.

6. The apparatus of claim 1 wherein the loosely packed mobile packing elements are disposed between two spaced, fluid-pervious grids, and the relatively fixed mobile packing elements are disposed adjacent the mobile packing elements between two spaced, fluid-pervious grids, said loosely packed mobile packing elements separated from said relatively fixed mobile packing elements by a common fluid-pervious grid.

7. The apparatus of claim 6 wherein the relatively fixed mobile packing elements are spherical elements having a density such that they would be aerated under normal upward gas flow through the elements, and wherein the relatively fixed mobile packing elements are held in close proximity to each other during upward gas flow through the tower by tight spacing of the two grids that the relatively fixed mobile packing elements are disposed between.

8. A liquid phase oxidation process for removing hydrogen sulfide from a hydrogen sulfide-containing gas stream wherein said gas stream is contacted in a gas-liquid mobile bed packed tower with a liquid oxidizing solution under conditions effective for oxidizing hydrogen sulfide to elemental sulfur which forms solid particles that become entrained in said liquid solution, said tower including at least one loosely packed bed of mobile packing elements, comprising:

intimately contacting the hydrogen sulfide-containing gas stream with said oxidizing solution in at least one packed bed of relatively fixed mobile packing elements disposed in said tower vertically adjacent to said loosely packed bed;

flowing gas sequentially through said packed beds; and flowing liquid sequentially through said packed beds for intimate contact with said gas, to achieve gas-liquid contact without substantial liquid surging or gas channeling in said loosely packed bed and to achieve gas-liquid contact in, and self-cleaning of the mobile packing elements in the relatively fixed bed.

9. The improvement of claim 8 wherein said liquid oxidizing solution comprises an aqueous polyvalent metal solution.

10. The improvement of claim 9 wherein said polyvalent metal is iron.

11. The improvement of claim 9 wherein said polyvalent metal is vanadium.

12. The process of claim 8 wherein the relative fixed packed bed has a height between adjacent grids such that the packing elements occupy at least 90% of said height when static.

13. A packed tower for use in gas-liquid contacting comprising:

a plurality of vertically adjacent packed beds of packing elements, each packed bed disposed between a pair of fluid-pervious grids and each packed bed including a combination of mobile packing elements and fixed packing elements; said mobile packing elements having a sufficiently low density such that the mobile packing elements are substantially aerated during upward gas flow through the tower during mass transfer; and said fixed packing elements having sufficient density such that they are not substantially aerated during upward gas flow through the tower during mass transfer.

14. The apparatus of claim 13 wherein the mobile packing elements are spherical and have a diameter of about 1 centimeter to about 10 centimeters.

15. The apparatus of claim 14 wherein the mobile packing elements are spherical and have a diameter of about 2 centimeters to about 8 centimeters.

16. The apparatus of claim 15 wherein the mobile packing elements are spherical and have a diameter of about 2 centimeters to about 5 centimeters.

* * * * *